United States Patent
Carson

[11] 3,924,938
[45] *Dec. 9, 1975

[54] REMOTELY CONTROLLED DAY-NIGHT OUTSIDE TRUCK MIRROR

[76] Inventor: James W. Carson, 204 Center Ave. South, Mitchellville, Iowa 50169

[ * ] Notice: The portion of the term of this patent subsequent to May 21, 1991, has been disclaimed.

[22] Filed: May 10, 1974

[21] Appl. No.: 468,678

Related U.S. Application Data

[63] Continuation-in-part of Ser. No. 266,230, June 26, 1972, Pat. No. 3,811,755.

[52] U.S. Cl................ 350/302; 350/280; 74/501 M
[51] Int. Cl.².................... G02B 5/08; G02B 17/00
[58] Field of Search............................ 350/276–281, 350/289, 299, 302, 303, 304, 307; 74/501 M

[56] References Cited
UNITED STATES PATENTS

| | | | |
|---|---|---|---|
| 1,781,999 | 11/1930 | Bittinger | 350/280 |
| 2,708,086 | 5/1955 | Prutzman | 350/304 |
| 3,325,239 | 6/1967 | Gionet et al. | 74/501 M |
| 3,411,372 | 11/1968 | Skillin | 74/501 M |

Primary Examiner—Ronald J. Stern
Assistant Examiner—Jon W. Henry
Attorney, Agent, or Firm—Zarley, McKee, Thomte & Voorhees

[57] ABSTRACT

A vertically positioned mirror unit is positioned on a mounting bracket connected to the cab door of a truck. The upper arm of the mounting bracket includes an end portion of spring material to normally maintain the mirror in a first position. A slot is provided in the outer end of the lower support arm, and a pin on the lower end of the mirror unit is received in the slot. A control cable is connected to the pin, and the cable extends through the lower mirror support arm into the cab of the truck. A lock means is provided in the control cable for selectively locking in the mirror at a desired angle against the spring action of the upper support arm. The mirror material is day-night non-glare. In an alternate embodiment the mirror includes a top portion of tinted darkened mirror glass while the bottom two-thirds of the mirror is of ordinary mirror glass. During the day the mirror is adjusted for viewing the following vehicles on the bottom clear mirror and at night on the top tinted mirror portion.

6 Claims, 7 Drawing Figures

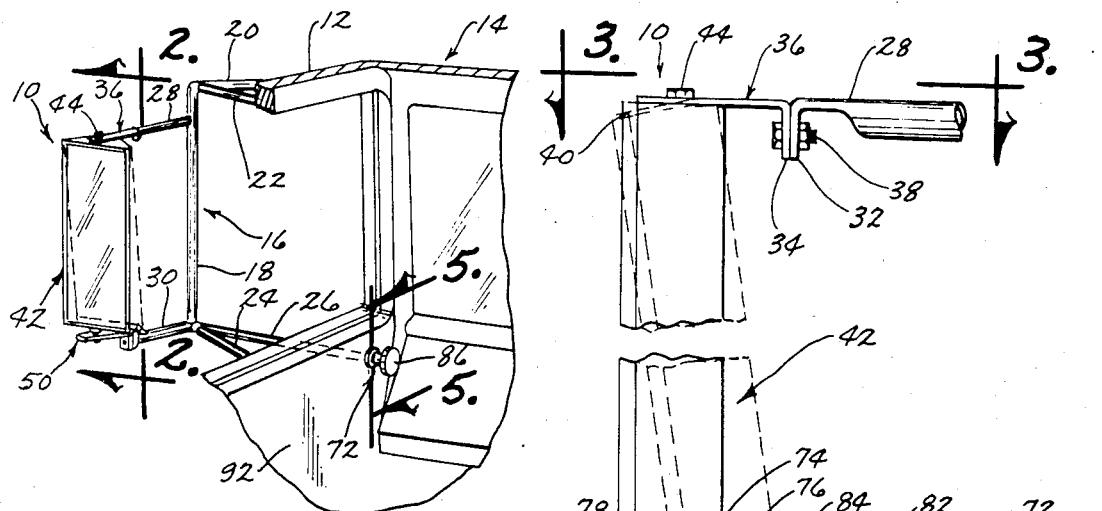

REMOTELY CONTROLLED DAY-NIGHT OUTSIDE TRUCK MIRROR

This application is a continuation-in-part application from application Ser. No. 266,230, filed June 26, 1972 now U.S. Pat. No. 3,811,755.

Large, long-distance trucks depend for rear vision on an outside mirror. Trucks commonly use the so-called "West Coast" mirror which is an elongated mirror unit, vertically arranged. The problem with these mirrors is that in night driving conditions, the lights of vehicles to the rear shine in the driver's eyes, causing a dangerous driving situation. Also, these large mirrors are adjustable only for rotation about a vertical axis, once they have been initially set.

The remotely controlled day-night outside truck mirror of this invention can be tilted at the bottom, forwardly, to a night, non-glare position through operation of a control cable extending from the mirror unit through the lower support arm into the truck cab. The turning of the cable element within its housing will enable the mirror to be locked in a given position. The mirror unit is supported substantially entirely by the upper support arm through a rotatable connection. The outer end of the upper support arm is made from spring material which positions the mirror unit into a first position. The control cable functions to move the lower end of the mirror unit forwardly against the action of the spring in the upper arm and thereby provides the nonglare mirror surface which eliminates light shining in the driver's eyes from vehicles to the rear. This adjustment of the mirror makes it possible to also view an area to the rear along the side of the truck which is normally not within the line of sight of the driver using the conventional outside truck mirror. The control cable is moisture and dirt-proof by being enclosed in a sleeve of rubber material and having an accordian-type sleeve portion at the mirror end, such that it will adjust lengthwise to the length of the cable. The upper and lower support arms include L-shaped brackets for connecting to the mirror unit.

An alternative mirror may include two mirror portions, the top one-third being tinted and the bottom two-thirds being clear. The mirror is then adjusted for evening viewing of trailing vehicles on the top tinted mirror and day viewing on the bottom clear mirror. Adjustment between day and night positions is easily accomplished by tilting the mirror.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary perspective view of the remotely controlled day-night outside truck mirror of this invention on a door of a truck cab and showing the mirror unit in two of several positions.

FIG. 2 is a cross sectional view taken along line 2—2 in FIG. 1.

FIG. 3 is a cross sectional view taken along line 3—3 in FIG. 2.

FIG. 4 is a cross sectional view taken along line 4—4 in FIG. 2.

FIG. 5 is a cross sectional view taken along line 5—5 in FIG. 1.

FIG. 6 is a view similar to FIG. 5 but showing the control cable in a locked position.

FIG. 7 is a front elevational view of an alternate embodiment which includes a mirror surface having tinted and clear portions.

The remotely controlled day-night outside truck mirror of this invention is referred to generally in FIG. 1 by the reference numeral 10 and is shown mounted on the door 12 of a truck cab 14. A mounting bracket 16 includes a vertical frame portion 18 from which a pair of mounting arms 20 and 22 and the lower end of the member 18 includes a corresponding pair of mounting arms 24 and 26. On the mirror side of the member 18 are upper and lower mirror unit support arms 28 and 30. The upper support arm 28 includes a downwardly-extending mirror element 32 to which one leg 34 of an L-shaped element 36 is secured by a bolt 38. The L-shaped element 36 is made of spring material and is secured to the upper end 40 of the mirror unit 42 by a rotatable bolt 44. The lower support arm 30 also includes a downwardly extending ear portion 46 through which one leg 48 of an L-shaped element 50 is secured by a bolt 52. A long, horizontally disposed leg 54 of the L-shaped element 50 includes an elongated slot 56 in which a pin 58 is positioned. The pin 58 has a rubber sleeve 60 on it which substantially fills the slot 56 in a transverse direction as seen in FIG. 4. The upper end of the pin 58 is connected to the lower end 62 of the mirror unit 42. A protective grommet 70 is provided in the slot 56 for engagement with the protective sleeve 60 on the pin 58.

A control cable assembly 72, seen in FIGS. 5 and 6, includes at its outer end a collar 74 on the pin 68 and the cable element 76 extends into the collar and through the pin 68 where it is locked thereto by a set screw 78. The control cable 72 includes a flexible, elongated housing 80 which is embraced by a protective rubber sleeve 82, having an accordian type sleeve element 84 at its outer end to compensate for the extension and contraction of the cable element 76 relative to its housing 80. A hand-operated control 86 is provided inside the cab 14 and includes a shaft 88 received in a mounting sleeve 90 extending through the inside and outside door panels 92 and 94, respectively, as seen in FIG. 5. A lock nut 96 secures the sleeve 90 to the inside door panel 92, and a grommet 98 seals the hole in the outside door panel 94 around the sleeve element 90. The shaft element 88 includes a plurality of transversely-extending spaced apart teeth 102 adapted to register on opposite sides of a lip 104 on the sleeve 90, as seen in FIG. 6, such that the cable element 76 can be locked in any desired position, thereby locking the mirror unit 42 at the desired angular position.

The cable housing 80, including the cable element 76 and protective rubber sleeve 82, extend through an opening 106 on the top side of the support arm 30 along its length into the interior of the cab 14, which protects the control cable 72 and also provides an uncluttered appearance.

It is seen in use that the mirror mounting bracket 16 may be readily mounted to the door of any truck cab and that the mirror in daytime usage will be in its solid line position of FIGS. 1 and 2, while at night the control cable 72 will be operated to the position of FIG. 6 when the mirror unit 42 is tilted to the dash-line position, thereby bringing the non-glare night mirror surface into operation and, accordingly, eliminating the glare from lights to the rear of the truck. In daytime, the control cable handle 86 is turned to the position of FIG. 5, thereby allowing it to retract into its housing 80 and allowing the spring action of the upper support outer end element 36 to pivot the mirror unit 42 to its solid line position of FIGS. 1 and 2, whereupon the normal daytime reflective surface of the mirror unit will be operative. During the daytime, should it be desired to see the ground alongside the truck, it is necessary only to pivot the mirror unit 42 to the nighttime position by operation of the hand element 86. The lower end of the mirror unit 42 is freely movable within the slot 56 on the L-shaped bracket 50, and the mirror unit is substantially entirely supported by the upper L-shaped element 36 on the upper support arm 28. Adjustability of the mirror from side-to-side is still possible about a vertical axis through the bolt 44, as seen in FIG. 3 by the solid and dashline positions.

It is understood that the mirror as depicted in FIGS. 1 – 6 may be inverted with the spring element 36 being at the bottom rather than at the top as shown. It is further understood that the mirror mounting bracket 16 may be connected to the cab of the truck independently of the door if desired.

An alternate embodiment 10A is shown in FIG. 7 and includes two mirror portions 200 and 202. The mirror portion 200 includes one-third of the mirror surface and is 3–5% tinted while mirror portion 202 is clear.

Thus in operation the mirror 10A is adjusted for daytime usage so that the clear mirror portion 202 provides an image of the following vehicles. At night the mirror is tilted at an angle such that the top tinted mirror portion 200 provides a view to the rear and thus eliminating the normal glare resulting from the bright lights of following vehicles.

It is further understood that the mirror 10A may be inverted with the tinted portion being at the bottom and the clear portion at the top.

I claim:

1. A remotely controlled outside truck mirror comprising, an elongated vertically disposed mirror unit having a mirror and a housing, said housing having an outwardly extending pin at one end, a mounting bracket assembly for attachment to the side of a truck cab, including upper and lower support arms, one of said arms having an elongated slot in which said pin at said one end of said housing is received, connecting means connecting the other support arm to the other end of said housing, and a control cable having one end positioning in a truck cab with the opposite end being connected to said outwardly extending pin thereby pivoting said mirror about a horizontal axis through said connecting means at the other end of said mirror unit as said pin at the one end moves back and forth in said slot in said one support arm.

2. The structure of claim 1 wherein the mirror includes tinted and clear portions.

3. The structure of claim 2 wherein the tinted portion is at the top and the clear portion is at the bottom of the mirror.

4. The structure of claim 3 wherein said tinted portion is substantially one-third of the total mirror surface.

5. The structure of claim 1 wherein said other arm includes means for biasing said one end of said mirror outwardly such that inward pull on said cable moves said one end rearwardly against the means biasing it outwardly.

6. The structure of claim 5 wherein said means for biasing said mirror outwardly is further defined by said outer end of said other support arm including an outer end formed from spring material for spring biasing said one end of said mirror outwardly.

\* \* \* \* \*